United States Patent
Wolf et al.

(10) Patent No.: US 10,635,934 B2
(45) Date of Patent: Apr. 28, 2020

(54) METHOD AND SYSTEM FOR IMAGE CONTENT RECOGNITION

(71) Applicant: Ramot at Tel-Aviv University Ltd., Tel-Aviv (IL)

(72) Inventors: Lior Wolf, Herzlia (IL); Noam Mor, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 59 days.

(21) Appl. No.: 16/132,518

(22) Filed: Sep. 17, 2018

(65) Prior Publication Data

US 2019/0095753 A1      Mar. 28, 2019

Related U.S. Application Data

(60) Provisional application No. 62/560,275, filed on Sep. 19, 2017.

(51) Int. Cl.
  *G06K 9/62* (2006.01)
  *G06K 9/68* (2006.01)
  (Continued)

(52) U.S. Cl.
  CPC ....... *G06K 9/6217* (2013.01); *G06K 9/00442* (2013.01); *G06K 9/03* (2013.01);
  (Continued)

(58) Field of Classification Search
  CPC ........ G06N 3/0454; G06N 3/084; G06N 3/08; G06N 20/10; G06N 7/005; G06N 20/00; G06N 3/082; G06N 3/006; G06N 3/02; G06N 3/0418; G06T 2207/20084; G06T 3/4046; G06T 7/0002; G06T 7/0014;
  (Continued)

(56) References Cited

U.S. PATENT DOCUMENTS 5,052,043 A    9/1991 Gaborski
5,812,698 A    9/1998 Platt et al.
(Continued)

FOREIGN PATENT DOCUMENTS

EP          1378855         10/2007
WO    WO 2019/058372      3/2019

OTHER PUBLICATIONS

International Search Report and the Written Opinion dated Dec. 20, 2018 From the International Searching Authority Re. Application No. PCT/IL2018/051047. (9 Pages).
(Continued)

*Primary Examiner* — Quan M Hua

(57) ABSTRACT

A method of recognizing image content, comprises applying to the image a neural network which comprises an input layer for receiving the image, a plurality of hidden layers for processing the image, and an output layer for generating output pertaining to an estimated image content based on outputs of the hidden layers. The method further comprises applying to an output of at least one of the hidden layers a neural network branch, which is independent of the neural network and which has an output layer for generating output pertaining to an estimated error level of the estimate. A combined output indicative of the estimated image content and the estimated error level is generated.

20 Claims, 13 Drawing Sheets

(51) Int. Cl.
G06K 9/00 (2006.01)
G06K 9/03 (2006.01)
G06K 9/42 (2006.01)
(52) U.S. Cl.
CPC ............. G06K 9/42 (2013.01); G06K 9/6277 (2013.01); G06K 9/6878 (2013.01); *G06K 2209/01* (2013.01)
(58) Field of Classification Search
CPC ........ G06T 2207/30168; G06K 9/6202; G06K 9/6267; G06K 2209/05; G06K 9/03; G06K 9/6257; G06K 9/6256; G06K 9/6215; G06K 9/4628; G06K 9/66; G06K 9/6255; G06K 9/4604; G06K 9/6217; G06K 9/6218; G06K 9/78
See application file for complete search history.

(56) References Cited

U.S. PATENT DOCUMENTS

| | | | | |
|---|---|---|---|---|
| 10,192,327 | B1* | 1/2019 | Toderici | H04N 19/90 |
| 10,319,476 | B1* | 6/2019 | LaBorde | G06N 3/08 |
| 2019/0392253 | A1* | 12/2019 | Ji | G06N 3/084 |

OTHER PUBLICATIONS

Almazan et al. "Word Spotting and Recognition With Embedded Attributes", IEEE Transactions on Pattern Analysis and Machine Intelligence, 36(12): 2552-2566, Dec. 2014.

Azeem et al. "Effective Technique for the Recognition of Offline Arabic Handwritten Words Using Hidden Markov Models", International Journal on Document Analysis and Recognition, IJDAR, 16(4): 399-412, Published Online Feb. 9, 2013.

Bluche et al. "A Comparison of Sequence-Trained Deep Neural Networks and Recurrent Neural Networks Optical Modeling for Handwriting Recognition", Proceedings of the 2nd International Conference on Statistical Language and Speech Processing, SLSP 2014, Grenoble, France, Oct. 14-16, 2014, p. 199-210, Oct. 14, 2014.

Doetsch et al. "Fast and Robust Training of Recurrent Neural Networks for Offline Handwriting Recognition", 2014 IEEE 14th International Conference on Frontiers in Handwriting Recognition, ICFHR 2014, Crete, Greece, Sep. 1-4, 2014, p. 279-284, Sep. 1, 2014.

Graves et al. "Connectionist Temporal Classification: Labelling Unsegmented Sequence Data With Recurrent Neural Networks", Proceedings of the 23rd International Conference on Machine Learning, ICML'06, Pittsburgh, PA, USA, Jun. 25-29, 2006, p. 369-376, Jun. 25, 2006.

Jaderberg et al. "Synthetic Data and Artificial Neural Networks for Natural Scene Text Recognition", arXiv Preprint arXiv: 1406.2227-1-1406.2227-10, Jun. 9, 2014.

Kingma et al. "ADAM: A Method for Stochastic Optimization", Proceedings of the International Conference on Learning Representations, ICLR 2015, arXiv Preprint arXiv:1412.6980v6, p. 1-15, Jun. 23, 2015.

Maergner et al. "ICDAR 2009 Arabic Handwriting Recognition Competition", Proceedings of the 2009 10th International Conference on Document Analysis and Recognition, ICDAR '09, Barcelona, Spain, Jul. 26-29, 2009, p. 1383-1387, Jul. 26, 2009.

Menasri et al. "The A2iA French Handwriting Recognition System at the Rimes—ICDAR2011 Competition", Proceedings of the SPIE, Document Recognition and Retrieval, 8297: 1-8, Jan. 23, 2012.

Shi et al. "An End-to-End Trainable Neural Network for Image-Based Sequence Recognition and Its Application to Scene Text Recognition", IEEE Transactions on Pattern Analysis & Machine Intelligence, 39(11): 2298-2304, Nov. 2017, ArXiv Preprint ArXiv:1507.05717v1, Jul. 21, 2015.

Stahlberg et al. "The QCRI Recognition System for Handwritten Arabic", International Conference on Image Analysis and Processing, ICIAP 2015, p. 276-286, Sep. 7, 2015.

* cited by examiner

FIG. 4A  *Seventy five and 00/100*  $75.00

| | Percentile 0 | Percentile 1 | Percentile 5 | Percentile 10 | Percentile 20 | Percentile 50 | Percentile 80 | Percentile 99 |
|---|---|---|---|---|---|---|---|---|
| | $4.10 | $90.00 | 188.00 | $33.65 | 1,156.00 | $1,262.00 | $0.00 | $0.00 |
| | $16.03 | 971.42 | $30.63 | 179.86 | $267.55 | $48.96 | 0.00 | $0.00 |
| | AMOUNT DUE $195.06 | -0.01 | 18.83- | $71.03 | 1100.80 | 23.41 | 0.00 | $0.00 |
| | $117.66 | $50.01 | .01 | 8.53 | $106.66 | 90.40 | 0.00 | $0.00 |
| | 117.03 | 20,514.00 | $53.00 | .00 | 570.88 | $50.38 | 0.00 | $0.00 |

FIG. 9

METHOD AND SYSTEM FOR IMAGE CONTENT RECOGNITION

RELATED APPLICATIONS

This application claims the benefit of priority under 35 USC 119(e) of U.S. Provisional Patent Application No. 62/560,275 filed on Sep. 19, 2017, the contents of which are incorporated by reference as if fully set forth herein in their entirety

FIELD AND BACKGROUND OF THE INVENTION

The present invention, in some embodiments thereof, relates to image processing and, more particularly, but not exclusively, to image content recognition.

Optical character recognition (OCR) generally involves translating images of text into an encoding representing the actual text characters. OCR techniques for text based on a Latin script alphabet are widely available and provide very high success rates. Handwritten text generally presents different challenges for recognition than typewritten text.

Known in the art are handwriting recognition techniques that are based on Recurrent Neural Networks (RNNs) and their extensions such as Long-Short-Term-Memory (LSTM) networks, Hidden Markov Models (HMMs), and combinations thereof [S. A. Azeem and H. Ahmed. Effective technique for the recognition of offline arabic handwritten words using hidden markov models. International Journal on Document Analysis and Recognition (IJDAR), 16(4):399-412, 2013; T. Bluche, H. Ney, and C. Kermorvant. A comparison of sequence-trained deep neural networks and recurrent neural networks optical modeling for handwriting recognition. In Statistical Language and Speech Processing, pages 199-210. Springer, 2014; P. Doetsch, M. Kozielski, and H. Ney. Fast and robust training of recurrent neural networks for offline handwriting recognition. In Frontiers in Handwriting Recognition (ICFHR), 2014 14th International Conference on, pages 279-284. IEEE, 2014; H. El Abed and V. Margner. Icdar 2009-arabic handwriting recognition competition. International Journal on Document Analysis and Recognition (IJDAR), 14(1):3-13, 2011; F. Menasri, J. Louradour, A. Bianne-Bernard, and C. Ker-morvant. The A2iA French handwriting recognition system at the Rimes-ICDAR2011 competition. In Proceedings of SPIE, volume 8297, 2012; and F. Stahlberg and S. Vogel. The qcri recognition system for handwritten arabic. In Image Analysis and Processing ICIAP 2015, pages 276-286. Springer, 2015].

Another method, published by Almazán et al. [J. Almazan, A. Gordo, A. Fornes, and E. Valveny. Word spotting and recognition with embedded attributes. IEEE Transactions on Pattern Analysis & Machine Intelligence, (12):2552-2566, 2014], encodes an input word image as Fisher Vectors (FV), which can be viewed as an aggregation of the gradients of a Gaussian Mixture Model (GMM) over low-level descriptors. It then trains a set of linear Support Vector Machine (SVM) classifiers, one per each binary attribute contained in a set of word properties. Canonical Correlation Analysis (CCA) is used to link the vector of predicted attributes and the binary attributes vector generated from the actual word.

An additional method, published by Jaderberg et al. [M. Jaderberg, K. Simonyan, A. Vedaldi, and A. Zisserman. Synthetic data and artificial neural networks for natural scene text recognition. arXiv preprint arXiv:1406.2227, 2014], uses convolutional neural networks (CNNs) trained on synthetic data for Scene Text Recognition.

Shi et al., arXiv preprint arXiv:1507.05717, discloses a neural network, which integrates feature extraction, sequence modeling and transcription into a unified framework. The network consists of convolutional layers, recurrent layers, and a transcription layer.

SUMMARY OF THE INVENTION

According to an aspect of some embodiments of the present invention there is provided a method of recognizing image content. The method comprises: applying a neural network to the image. The neural network comprising an input layer for receiving the image, a plurality of hidden layers for processing the image, and an output layer for generating output pertaining to an estimated image content based on outputs of the hidden layers. The method further comprises applying a neural network branch to an output of at least one of the hidden layers. The neural network branch being independent of the neural network and having an output layer for generating output pertaining to an estimated error level of the estimate. The method further comprises generating a combined output indicative of the estimated image content and the estimated error level.

According to some embodiments of the invention the neural network branch comprises at least one recurrent layer generating a plurality of output values. According to some embodiments of the invention the at least one recurrent neural layer is a Long Short Term Memory (LSTM) layer. According to some embodiments of the invention the LSTM layer is a bi-directional layer.

According to an aspect of some embodiments of the present invention there is provided a method of recognizing image content. The method comprises: applying a neural network to the image. The neural network comprising an input layer for receiving the image, a plurality of hidden layers for processing the image, and an output layer for generating output pertaining to an estimated image content based on outputs of the hidden layers. The method further comprises calculating a confidence score by obtaining output probabilities that are generated by the neural network to two most probable recognitions, and assigning a confidence score that correlates with a ratio or difference between the two probabilities.

According to some embodiments of the invention the method comprises summing or averaging the plurality of output values or projections thereof, thereby providing the estimated error level.

According to some embodiments of the invention the neural network comprises a convolutional neural subnetwork generating a set of feature vectors, each corresponding to an application of the convolutional subnetwork different window within the image.

According to some embodiments of the invention the neural network comprises a recurrent neural subnetwork receiving the set of feature vectors from the convolutional neural subnetwork, and wherein the output of the least one of the hidden layers is an output of at least one layer of the recurrent neural subnetwork. According to some embodiments of the invention the recurrent neural subnetwork comprises LSTM layers. According to some embodiments of the invention at least one of the LSTM layers is a bi-directional layer.

According to some embodiments of the invention the recurrent neural subnetwork generates a sequence of vectors, and the method comprises projecting a dimension of each vector of the sequence onto a predetermined dimension corresponding to a length of an alphabet, to provide a sequence of probability distributions over the alphabet, each probability distribution corresponding to a region within the image.

According to some embodiments of the invention the neural network comprises a Connectionist temporal classification (CTC) layer receiving the sequence of probability distributions and generating the estimate.

According to some embodiments of the invention the method comprises transforming a height of the image to a predetermined height, prior to the application of the neural network.

According to some embodiments of the invention the image is an image of handwritten symbols.

According to some embodiments of the invention the image is an image of machine printed symbols.

According to some embodiments of the invention the image comprises at least one region containing handwritten symbols and at least one region containing machine printed symbols.

According to some embodiments of the invention the image is an image of a bank check.

According to some embodiments of the invention the bank check comprises a plurality of bank check fields, and the method is repeated separately for at least two of the bank check fields.

According to an aspect of some embodiments of the present invention there is provided a computer software product, comprising a computer-readable medium in which program instructions are stored, which instructions, when read by a computer, cause the computer to receive an input image and to execute the method as delineated above and optionally and preferably as further detailed below.

According to an aspect of some embodiments of the present invention there is provided a system for recognizing image content. The system comprises an imaging system for imaging an object to provide an image thereof. The system also comprises an image processor configured for: receiving the image; applying a neural network to the image, the neural network comprising an input layer for receiving the image, a plurality of hidden layers for processing the image, and an output layer for generating output pertaining to an estimated image content based on outputs of the hidden layers; applying a neural network branch to an output of at least one of the hidden layers, the neural network branch being independent of the neural network and having an output layer for generating output pertaining to an estimated error level of the estimate; and generating a combined output indicative of the estimated image content and the estimated error level.

According to an aspect of some embodiments of the present invention there is provided a system for recognizing image content. The system comprises a network interface for receiving an image over a communication network. The system also comprises an image processor configured for: applying a neural network to the image, the neural network comprising an input layer for receiving the image, a plurality of hidden layers for processing the image, and an output layer for generating output pertaining to an estimated image content based on outputs of the hidden layers; applying a neural network branch to an output of at least one of the hidden layers, the neural network branch being independent of the neural network and having an output layer for generating output pertaining to an estimated error level of the estimate; and generating a combined output indicative of the estimated image content and the estimated error level.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 4A, 4B and 4C are images showing example images from three datasets used in experiments performed according to some embodiments of the present invention;

FIG. 9 shows non-reject image examples from the test set obtained from owned by Orbograph Ltd., and used during experiments performed according to some embodiments of the present invention.

DESCRIPTION OF SPECIFIC EMBODIMENTS OF THE INVENTION

Figure 1:
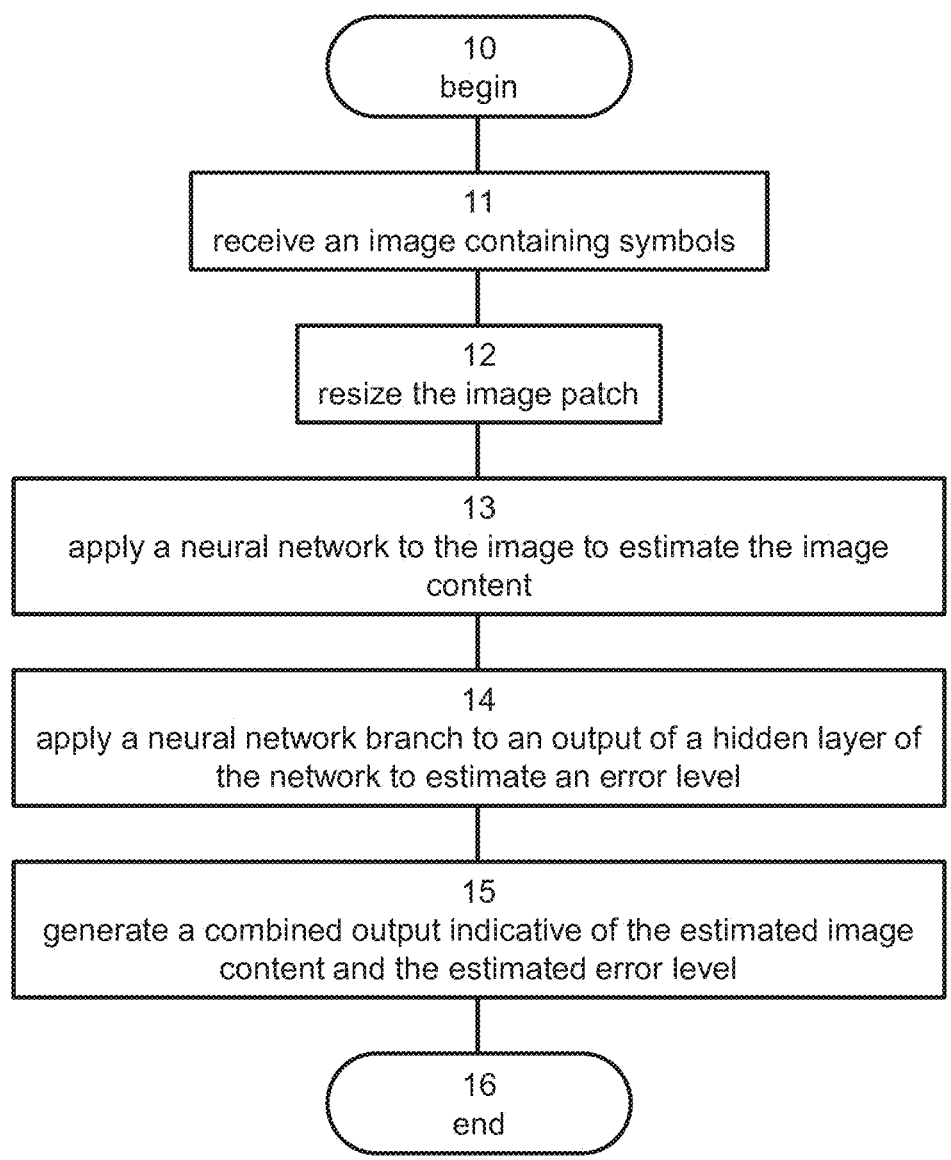
FIG. 1 is a flowchart diagram of a method suitable for recognizing image content, according to various exemplary embodiments of the present invention.

The present invention, in some embodiments thereof, relates to image processing and, more particularly, but not exclusively, to image content recognition.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flowchart diagram of a method suitable for recognizing image content, according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

At least part of the operations described herein can be can be implemented by a data processing system, e.g., a dedicated circuitry or a general purpose computer, configured for receiving data and executing the operations described below. At least part of the operations can be implemented by a cloud-computing facility at a remote location.

Computer programs implementing the method of the present embodiments can commonly be distributed to users by a communication network or on a distribution medium such as, but not limited to, a floppy disk, a CD-ROM, a flash memory device and a portable hard drive. From the communication network or distribution medium, the computer programs can be copied to a hard disk or a similar intermediate storage medium. The computer programs can be run by loading the code instructions either from their distribution medium or their intermediate storage medium into the execution memory of the computer, configuring the computer to act in accordance with the method of this invention. During operation, the computer can store in a memory data structures or values obtained by intermediate calculations and pulls these data structures or values for use in subsequent operation. All these operations are well-known to those skilled in the art of computer systems.

Processing operations described herein may be performed by means of processer circuit, such as a DSP, microcontroller, FPGA, ASIC, etc., or any other conventional and/or dedicated computing system.

The method of the present embodiments can be embodied in many forms. For example, it can be embodied in on a tangible medium such as a computer for performing the method operations. It can be embodied on a computer readable medium, comprising computer readable instructions for carrying out the method operations. In can also be embodied in electronic device having digital computer capabilities arranged to run the computer program on the tangible medium or execute the instruction on a computer readable medium.

Referring now to FIG. 1, the method begins at 10 and optionally and preferably continues to 11 at which an image is received. The image typically contains symbols belonging to an alphabet, including, without limitation, characters, accent symbols, digits and/or punctuation symbols. In some embodiments of the present invention, the image contains handwritten symbols, in which case the alphabet is a set of handwritten symbols. In some embodiments of the present invention, the image contains printed symbols, in which case the alphabet is a set of printed symbols. Also contemplated are images containing both handwritten and printed symbols. A representative example of such an image is an image of a bank check having a plurality of fields some of which may include handwritten symbols (e.g., amounts in digits and words, etc.), and some of which may include printed symbols (e.g., account No., name of account owner, etc.)

The image is preferably a digital image and can be received from an external source, such as a storage device storing the image in a computer-readable form, and/or be transmitted to a data processor executing the method operations over a communication network, such as, but not limited to, the internet. In some embodiments of the present invention the method comprises capturing the image using an imaging system, e.g., a scanner or a digital camera.

The method optionally and preferably continues to 12 at which the input image is resized. This operation is particularly useful when the image is received as input from an external source. The resizing can include stretching or shrinking along any of the axes of the image to a predetermined width, a predetermined length and/or a predetermined diagonal, as known in the art. The resize along each axes can be independent. For example, the method can transform only the height of the image to a predetermined height, without changing the width, or vice versa, or transform both height and width according to different transformation scenarios.

Figures 2A, 2B:
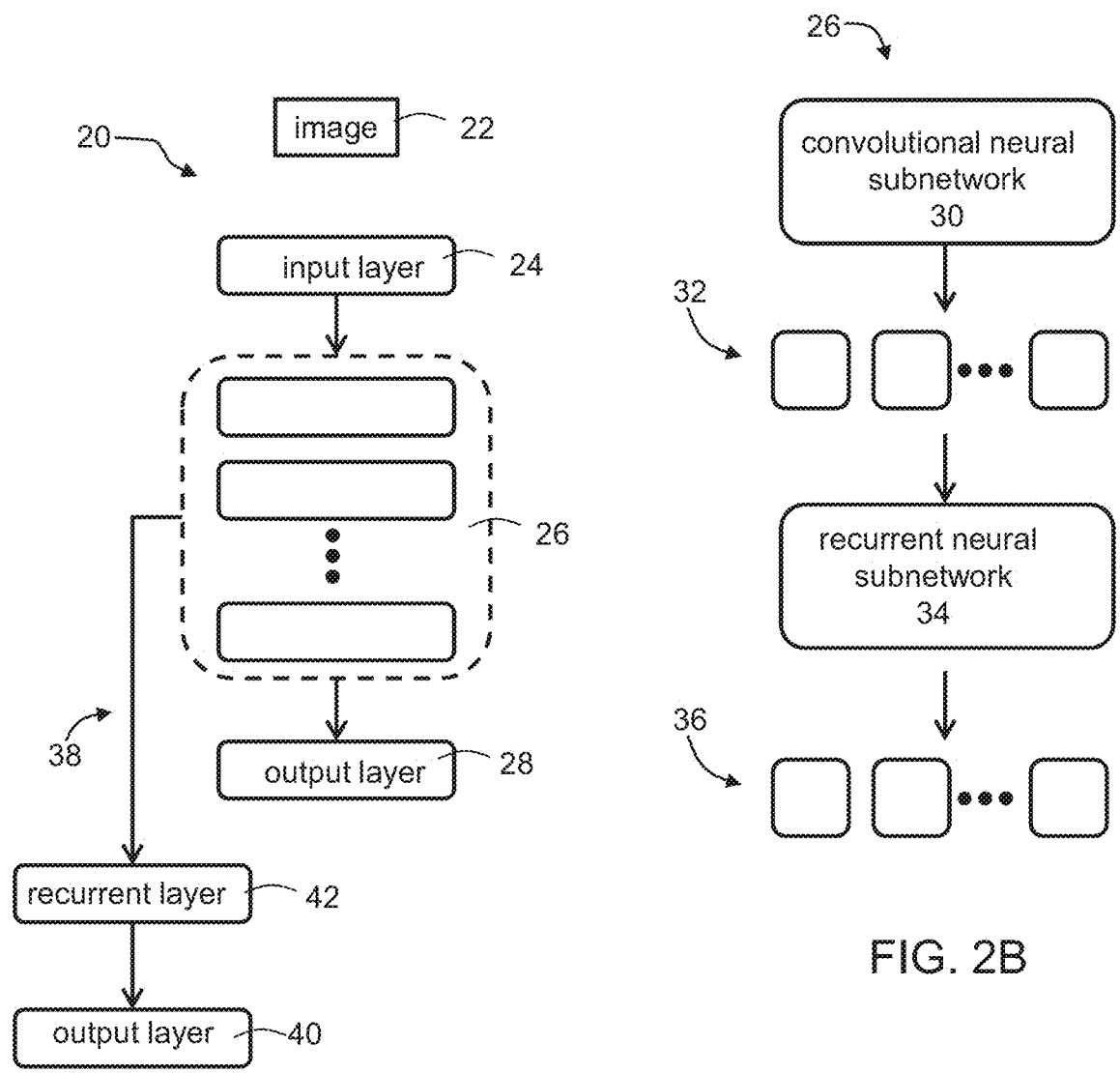
FIGS. 2A and 2B are schematic illustrations of a representative example of a neural network and a neural network branch suitable for recognizing image content, according to various exemplary embodiments of the present invention.

At 14, a neural network is applied to the image. A representative example of a neural network 20 suitable for the present embodiments is illustrated in FIGS. 2A and 2B. Neural network 20 typically comprises an input layer 24 for receiving the image 22, a plurality of hidden layers 26 for processing the image, and an output layer 28 for generating output pertaining to an estimated image content based on outputs of hidden layers 26. The neural network is optionally and preferably pre-trained to estimate the image content according to a specific alphabet, a subset of which is contained in the image to which the neural network is designed to be applied.

In some embodiments of the present invention the hidden layers 26 of neural network 20 comprise a convolutional neural subnetwork 30 (see FIG. 2B) generating a set 32 of feature vectors, each corresponding to an application of convolutional subnetwork 30 to a different window within the image 22. The set 32 of feature vectors can thus represent a window moving over the image from one side of the image to the other. Optionally, but not necessarily, convolutional neural subnetwork 30 is a fully convolutional neural subnetwork.

Unlike fully-connected networks or subnetworks which associate a single value with each neuron of the network or subnetwork, convolutional neural networks or subnetworks operate by associating an array of values with each neuron. Conceptually, this array can be thought of as a small patch of the input image. The transformation of a neuron value for the subsequent layer is generalized from multiplication to convolution. This implies that the connection strengths are convolution kernels rather than scalar values. These more complex transformations involve more complex neural network matrices. Thus, while a matrix in a fully-connected network or subnetwork comprises an array of number values, in a convolutional neural network or subnetwork, each matrix entry is a patch of pixels.

Neural network 20 can optionally and preferably comprise a recurrent neural subnetwork 34 receiving set 32 of feature vectors from convolutional neural subnetwork 30. Recurrent neural subnetwork 34 optionally and preferably employs one or more long short-term memory (LSTM) layers, more preferably one or more bidirectional LSTM layers.

Recurrent neural networks or subnetworks are designed to accept sequences of varying lengths as input. The same set of weights is used in the processing of each sequence element. Such subnetworks are constructed in a layered manner, such that every neuron of layer accepts as inputs the activations of all neurons from the previous layer, and, an addition, there are lateral connections with the activations induced at the previous step in the sequence. Bidirectional neural networks or subnetworks are employ layers going forward and layers going backwards. These two types of layers exist in parallel and the activations of both, concatenated, serve as the input to the next layer.

Long Short-Term Memory (LSTM) layers employ memory cells' in lieu of simple activations. Access to the memory cells is controlled by multiplicative factors that are called gating. At each input state, gates are used in order to decide the portion of the new input that is to be written to the memory cell, the portion of the current content of the memory cell that is to be forgotten, and the portion of the content that is to be outputted. For example, if the output gate is closed (a value of 0), the neurons connected to the current neuron receive a value of 0. If the output gate is partly open at a gate value of 0.5, the neuron can output half of the current value of the stored memory.

Recurrent neural subnetwork 34 typically generates a sequence 36 of vectors. In these embodiments, the method optionally and preferably projects the dimension of each vector of sequence 36 onto a predetermined dimension corresponding to a length of the alphabet, thus providing a sequence of probability distributions over the alphabet, wherein each probability distribution corresponds to a region within the image. In some embodiments of the present invention output layer 28 comprises a Connectionist Temporal Classification (CTC) layer [Graves et al., Connectionist temporal classification: Labelling unsegmented sequence data with recurrent neural networks. In *Proceedings of the 23rd International Conference on Machine Learning*, ICML '06, pages 369-376, New York, N.Y., USA, 2006. ACM] that receives the sequence of probability distributions and generates the estimate of the image content according to the alphabet.

The CTC layer can be used both for training the network and for using the network to recognize the content of the image. For the former, a loss function is used. For the latter, the CTC decoding scheme is optionally and preferably employed to obtain the output. This can be done using greedy decoding to obtain the highest probability decoding, or using a beam-search scheme to obtain the n highest probability decoding values.

The method optionally and preferably proceeds to 14 at which a neural network branch 38 is applied to an output of at least one of hidden layers 26. Network branch 38 is applied to an output of any of hidden layers 26. One or more of the recurrent neural layer(s) of branch 38 can be, for example, an LSTM layer, more preferably a bi-directional LSTM layer. Typically, branch 38 is applied to the output of one of the layers in recurrent neural subnetwork 34, e.g., the output of one of the LSTM layer, when such layers are employed. Preferably, but not necessarily, network branch 38 is applied to the output of the first layer in the recurrent neural subnetwork 34, namely the output of the layer that is fed by the set 32 of feature vectors generated by convolutional neural subnetwork 30.

Neural network branch 38 is optionally and preferably independent of neural network 20. Branch 38 has an output layer 40 generating output pertaining to an estimated error level of the estimate generated by layer 28. Optionally and preferably, neural network branch 38 comprises one or more recurrent layers 42 generating a plurality of output values. The method optionally and preferably sums the output values to provide the estimated error level. Typically, the output values provided by recurrent layers 42 are vector values. In these embodiments, each of the vector values provided by recurrent layers 42 is projected to a scalar, thereby providing a plurality of scalars that can optionally and preferably be subsequently summed or averaged, so that the error level generated by output layer 40 is also a scalar.

The method proceeds to 15 at which a combined output indicative of the estimated image content and the estimated error level is generated. The combined output can be displayed on a display device, printed on a print medium and/or transmitted to a remote computer over a communication network.

The method ends at 16.

Figure 3:
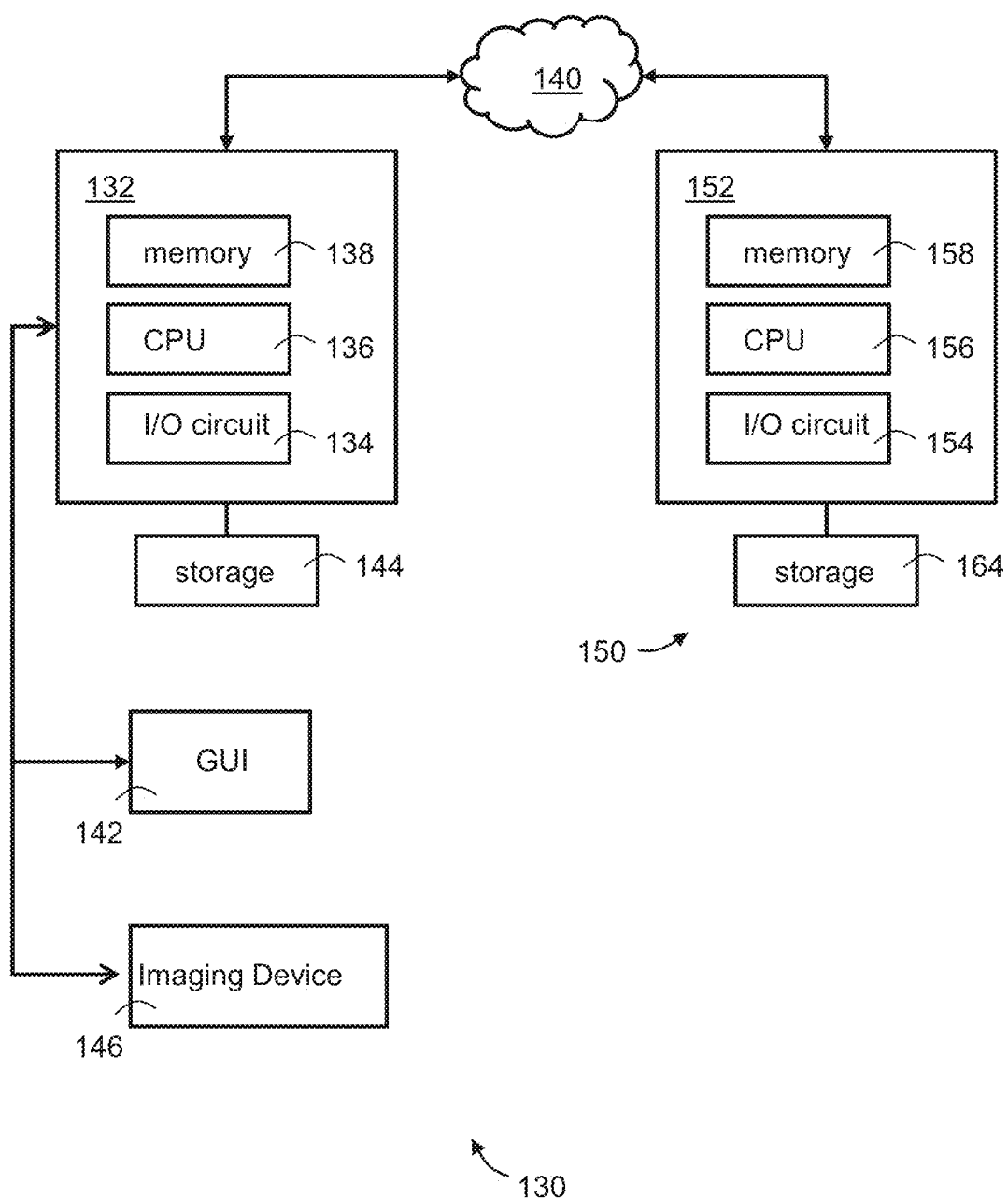
FIG. 3 is a schematic illustration of a computer system suitable for recognizing image content, according to various exemplary embodiments of the present invention.

FIG. 3 is a schematic illustration of a client computer 130 having a hardware processor 132, which typically comprises an input/output (I/O) circuit 134, a hardware central processing unit (CPU) 136 (e.g., a hardware microprocessor), and a hardware memory 138 which typically includes both volatile memory and non-volatile memory. CPU 136 is in communication with I/O circuit 134 and memory 138. Client computer 130 preferably comprises a graphical user interface (GUI) 142 in communication with processor 132. I/O circuit 134 preferably communicates information in appropriately structured form to and from GUI 142. Also shown is a server computer 150 which can similarly include a hardware processor 152, an I/O circuit 154, a hardware CPU 156, a hardware memory 158. I/O circuits 134 and 154 of client 130 and server 150 computers can operate as transceivers that communicate information with each other via a wired or wireless communication. For example, client 130 and server 150 computers can communicate via a network 140, such as a local area network (LAN), a wide area network (WAN) or the Internet. Server computer 150 can be in some embodiments be a part of a cloud computing resource of a cloud computing facility in communication with client computer 130 over the network 140. Further shown, is an imaging device 146 such as a camera or a scanner that is associated with client computer 130.

GUI 142 and processor 132 can be integrated together within the same housing or they can be separate units communicating with each other. Similarly, imaging device 146 and processor 132 can be integrated together within the same housing or they can be separate units communicating with each other.

GUI 142 can optionally and preferably be part of a system including a dedicated CPU and I/O circuits (not shown) to allow GUI 142 to communicate with processor 132. Processor 132 issues to GUI 142 graphical and textual output generated by CPU 136. Processor 132 also receives from GUI 142 signals pertaining to control commands generated by GUI 142 in response to user input. GUI 142 can be of any type known in the art, such as, but not limited to, a keyboard and a display, a touch screen, and the like. In preferred embodiments, GUI 142 is a GUI of a mobile device such as a smartphone, a tablet, a smartwatch and the like. When GUI 142 is a GUI of a mobile device, processor 132, the CPU circuit of the mobile device can serve as processor 132 and can execute the code instructions described herein.

Client 130 and server 150 computers can further comprise one or more computer-readable storage media 144, 164, respectively. Media 144 and 164 are preferably non-transitory storage media storing computer code instructions as further detailed herein, and processors 132 and 152 execute these code instructions. The code instructions can be run by loading the respective code instructions into the respective execution memories 138 and 158 of the respective processors 132 and 152.

Each of storage media 144 and 164 can store program instructions which, when read by the respective processor, cause the processor to receive an input image and to execute the method as described herein. In some embodiments of the present invention, an input image is generated by imaging device 130 and is transmitted to processor 132 by means of I/O circuit 134. Processor 132 estimate the content of the image and the error of the estimate as further detailed hereinabove and display the combined output, for example, on GUI 142. Alternatively, processor 132 can transmit the image over network 140 to server computer 150. Computer 150 receives the image, estimate the content of the image and the error of the estimate as further detailed hereinabove and transmits the combined output back to computer 130 over network 140. Computer 130 receives the combined output and displays it on GUI 142.

As used herein the term "about" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

This Example described an Optical Character Recognition (OCR) process that was applied to handwritten and printed bank checks. The applied process included the method according to some embodiments of the present invention wherein a neural network was applied to the image to estimate the image content based on outputs of the hidden layers, and a neural network branch was applied to an output of one of the hidden layers to estimate the error level of the image content estimate.

Three different datasets containing real-world images of three different fields from bank checks have been used in this example. The datasets are named herein Account, CAR and LAR, where Account corresponds to a numeric field of account numbers, CAR corresponds to the check dollar amount, written as digits, and LAR corresponds to the check dollar amount, written in words. FIGS. 4A-C shows example images from the LAR dataset (FIG. 4A, showing "seventy five and 00"), the CAR dataset (FIG. 4B, showing "486.37") and the Account dataset (FIG. 4C showing "161020417").

For each image, the datasets contained a reference transcription of its content.

Network Architecture

The network architecture was as follows. For the recognition part of the network, an end-to-end trainable network was used. The network took, for training, only the image and its transcription. In this example the image height was normalized to 64 pixels, and the image width and the transcription's length were of arbitrary length. No alignment information was used to train the network.

The input image first goes through a VGG-style convolutional neural network, composed of convolutional layers, batch normalization layers, and max-pooling layers. In this example, ReLU was used as an activation function, but other activation functions are also contemplated. In this example, the pooling layers decreased the image height from 64 to 1, and also decreased the image width by a factor of 8. This provided 3 max-pooling layers with dimensions 2×2 and 3 max-pooling layers with dimensions 2×1.

Three convolutional layers were employed between each two pooling operations. In this example, the shape of the convolutional layers was 3×3 and padding 1. A batch normalization layer and an activation function was employed after each convolutional layer.

The output of the convolutional stage was a sequence of feature vectors, where every feature vector was the result of applying the convolutional network to a window in the original image. The feature vectors thus corresponded to looking at the image with a sliding window from left to right.

The obtained sequence of feature vectors was fed as input to a recurrent subnetwork which in this example included two bi-directional LSTM layers. Both bi-LSTM layers were realized as a concatenation of two LSTM layers with 1024 units. After the convolutional and LSTM layers, a variable-length sequence of vectors of length 2048 was obtained. A linear projection was then applied from dimension 2048 to the length of the desired alphabet, to obtain a sequence of probability distributions over the alphabet, each corresponding to a rectangular receptive field in the original image.

The final transcription was given by applying the Connectionist Temporal Classification (CTC) layer to the resulting sequence. This layer defined a probability for an output sequence given the probability vectors that come from the previous layer. The output sequence was then defined to be the sequence with the highest probability given the probability vectors. For training, the loss function was defined as the negative log-likelihood of the correct transcription given the per-window probability distributions.

Predicting Errors

The present inventors found that the CTC transcription probability performs poorly as a predictor of image mislabeling. The present inventors have therefore attached an error predicting branch to the network. The input of the error predicting branch was a layer from the middle of the network (a hidden layer), and the output of the error predicting branch was a single number, which was used either as a prediction of the number of errors in the transcription (the Edit Distance) as a regression task, or as a log-probability that the transcription is correct, as a classification task.

Figure 5:
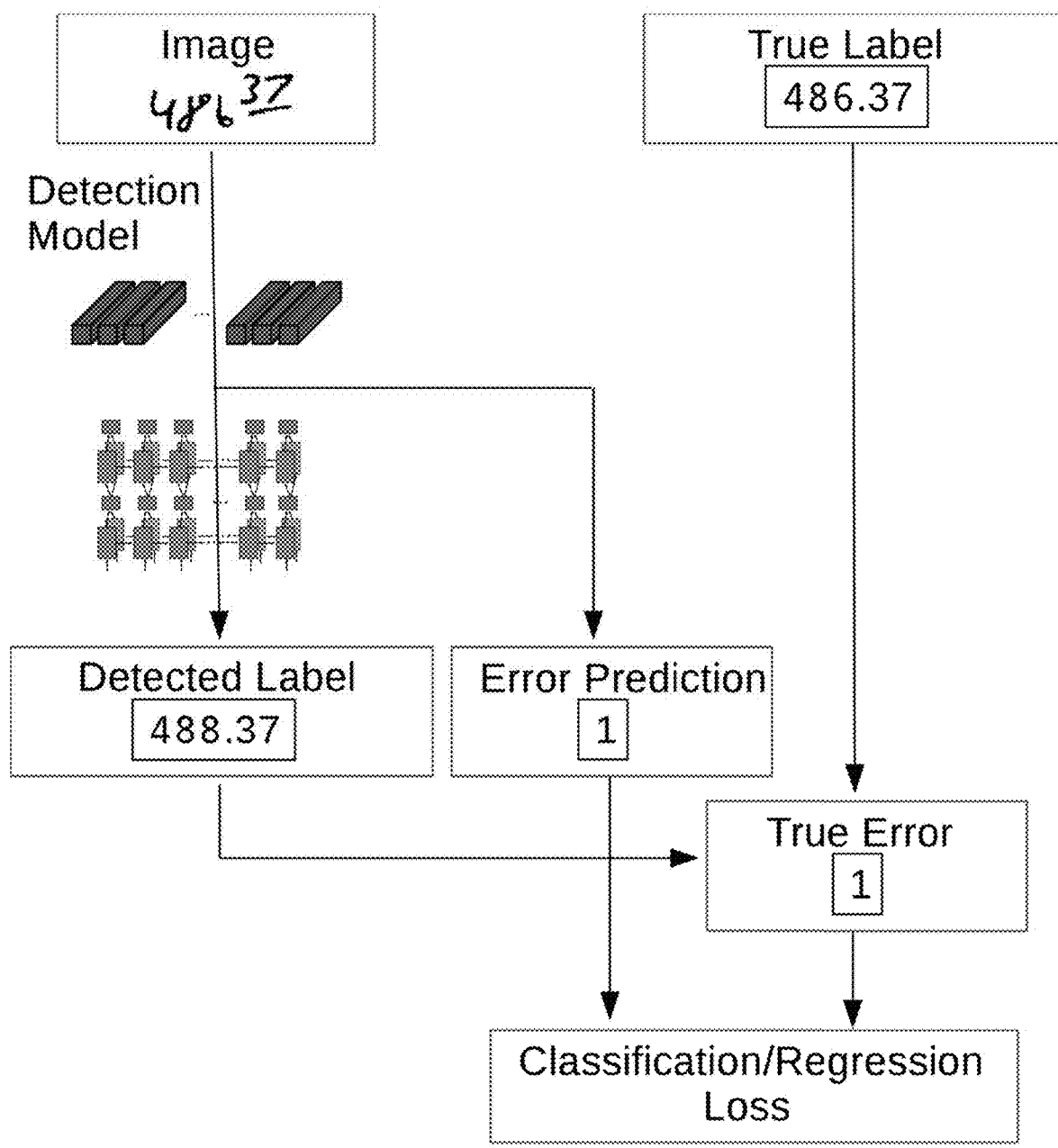
FIG. 5 is a schematic illustration of a training process of an error prediction branch, used in experiments performed according to some embodiments of the present invention.

FIG. 5 illustrates the training process of the error prediction branch of the network. For training, only the source image and the correct transcription were used. The ground truth for training was calculated by running the image through the sequence prediction network, calculating the observed error between the network output and the ground truth, and training the error prediction branch based on this difference.

In the present example, the error prediction branch took as its input the output of the first bidirectional LSTM layer. Each vector of length 2048 was projected to a vector of smaller dimension (a vector of length 128, in the present example). Another bi-directional LSTM layer (with 128 units, in the present example) was then applied to the projected vector. Each of the outputs of the LSTM layer was projected to a scalar, and these scalars were summed, to provide a scalar output. Alternatively, the scalar output can be provided by averaging over these scalars (rather than only summing them), for example, to reduce the impact of the image width on the result. This scalar output was defined as the output of the error prediction branch, and was used as a log probability of the classification process.

Summing or averaging the projected scalars coming from the LSTM provided locality of error detection. This was advantageous both for the classification, where the method predicted whether the detected label is the same as the ground truth, and for a regression process, where the method predicted the number of errors the network makes. For classification, when the network outputs a large value at two different locations, the final sum is larger, which is consistent with the observation that there is a larger probability for error. For regression, when the network makes multiple errors, the error detection process is expected to detect errors in multiple locations, and the more locations get high values, the higher the error prediction should be.

The training of the sequence prediction network and of the error prediction branch was not done on the same dataset. The reason for that is that deep neural network models typically reach overfitting on the training set. When overfitting occurs, the loss function and the perceived labeling error reaches 0 or very close to it. If one attempts to train the error prediction branch jointly with the network, the outcome of the training is that the error predictor always output zeros. For this reason, training was a two-stage operation, where the network that provides the transcription was trained on a training set and evaluated on a validation set; and the error prediction branch was trained on the validation set and evaluated on the test set.

Experimental Results

The system was trained on the three datasets (CAR, LAR, Account), achieving good accuracy. The error was measured as the overall edit distance, divided by the length of the correct string. The results are summarized in Table 1, below. In Table 1, the whole field accuracy results of the LAR have been measured after post-processing the transcription data. Measurements of accuracy of the dollar amount and the cent amount were provided separately.

TABLE 1

| Dataset | Normalized Edit Distance | Whole-Field Accuracy | Dollar/Cent Amount Accuracy |
| --- | --- | --- | --- |
| CAR | 0.028 | 92% | 92%/96% |
| LAR | 0.066 | 90%/75% | 84%/77% |
| Account | 0.018 | 86.3% | |

For error prediction, an assortment of six models was trained and their results were compared. Three of the models were binary classification for predicting whether the resulting string is correct, and three were regression models that try to minimize the loss to the edit distance.

The three models were:
1. LSTM Sum—as described above, LSTM, projection and summation.
2. LSTM last state—running a bidirectional LSTM, taking its last state vector and projecting it to obtain a scalar.
3. LSTM last state MLP—running a bidirectional LSTM, taking its last state vector and running a small neural network model with one hidden layer on it to obtain a scalar.

Figure 6:
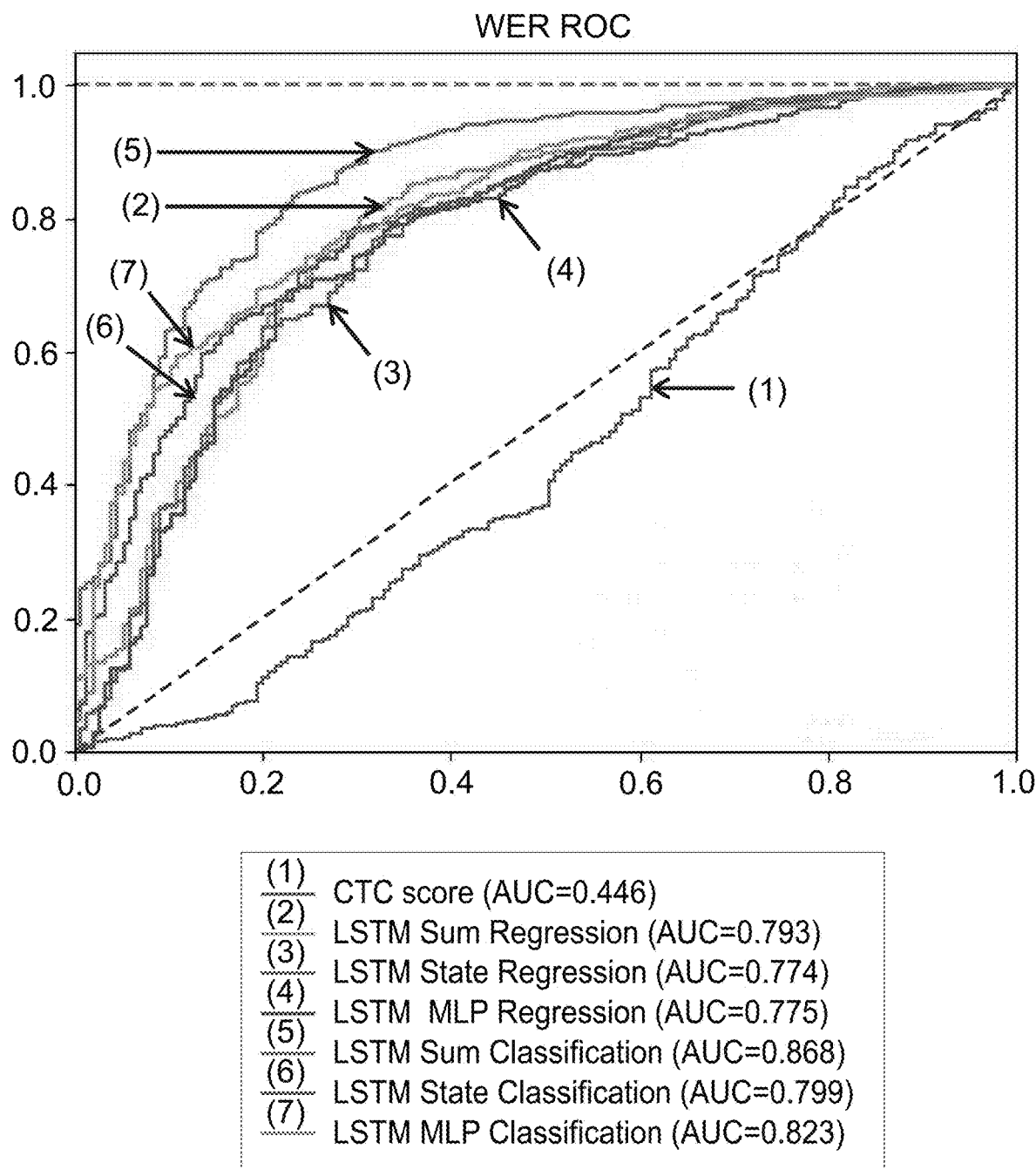
FIG. 6 shows ROC curves obtained in experiments performed according to some embodiments of the present invention.

FIG. 6 shows ROC curves for all six models and the reference CTC score on the CAR dataset. The ROC curve shows the trade-off between the misread rate and the total system read rate. For example, a point at 0.2 misread rate and 0.9 read rate denotes that by picking a certain confidence threshold, the system rejects 10% of the valid data, and reduces the number of errors by 80%. To compare the effectiveness of different confidence methods, the area under curve (AUC) metric is used. As shown in FIG. 6, the CTC score performs very badly as a measurement for error prediction. In contrast, the LSTM sum classification of the present embodiments performs significantly better than all other models, with an AUC of 0.87.

Additional experiments were conducted using several benchmarks as well as on a dataset, owned by Orbograph Ltd. Yavne, Israel, including real-world cropped images of scanned dollar amounts for each method.

In the following experiments, two techniques were used to obtain a confidence measure. In a first technique, referred to below as "CTC ratio", a probability ratio was used as confidence without using neural network branch 38. In this technique, probabilities that the OCR model assigns to its first and second most probable readings, given an input image, are obtained. A high confidence score is assigned where the first reading is much more probable than the second reading. If it is not, then the sample is ambiguous, and so its confidence score is lowered. In a second technique, referred to below as "ErrPred", an error prediction branch was added to the network, to directly predict whether either the OCR model will err given the input, or the sample should be rejected. The error prediction branch enacted neural network branch 38 (FIG. 2A).

The benchmarks included: ICDAR 2013 (IC13) [Karatzas et al., Icdar 2013 robust reading competition, Document Analysis and Recognition (ICDAR), 2013 12th International Conference on, pages 1484-1493. IEEE, 2013], Street View Text (SVT) [Wang et al., End-to-end scene text recognition. In Computer Vision (ICCV), 2011 IEEE International Conference on, pages 1457-1464, IEEE, 2011], IAM [Marti et al., The iam-database: an English sentence database for offline handwriting recognition, International Journal on Document Analysis and Recognition, 5(1):39-46, 2002], and RIMES [Grosicki et al., Icdar 2009 handwriting recognition competition, Document Analysis and Recognition, 2009. ICDAR'09. 10th International Conference on, pages 1398-1402, IEEE, 2009].

In the IC13 dataset, the test set contains 251 scene images with labeled bounding boxes. The test set was restricted to contain only alpha-numeric characters with three characters or more, resulting in a test set of about 900 cropped text images.

The SVT dataset consists of 249 images collected from Google Street View. The word images have been cropped from these images, resulting in a test set of 647 samples.

The IAM dataset consists of scanned handwritten English texts by 657 writers, giving a total of 115,320 labeled word images. After filtering out punctuation and short words, a training set of 40,526 samples was obtained.

The RIMES dataset consists of scanned handwritten French texts by 1300 people, giving a total of 67,000 words. Restricted to long enough words without punctuation, the training set size became 35,723 samples.

Figure 7A:
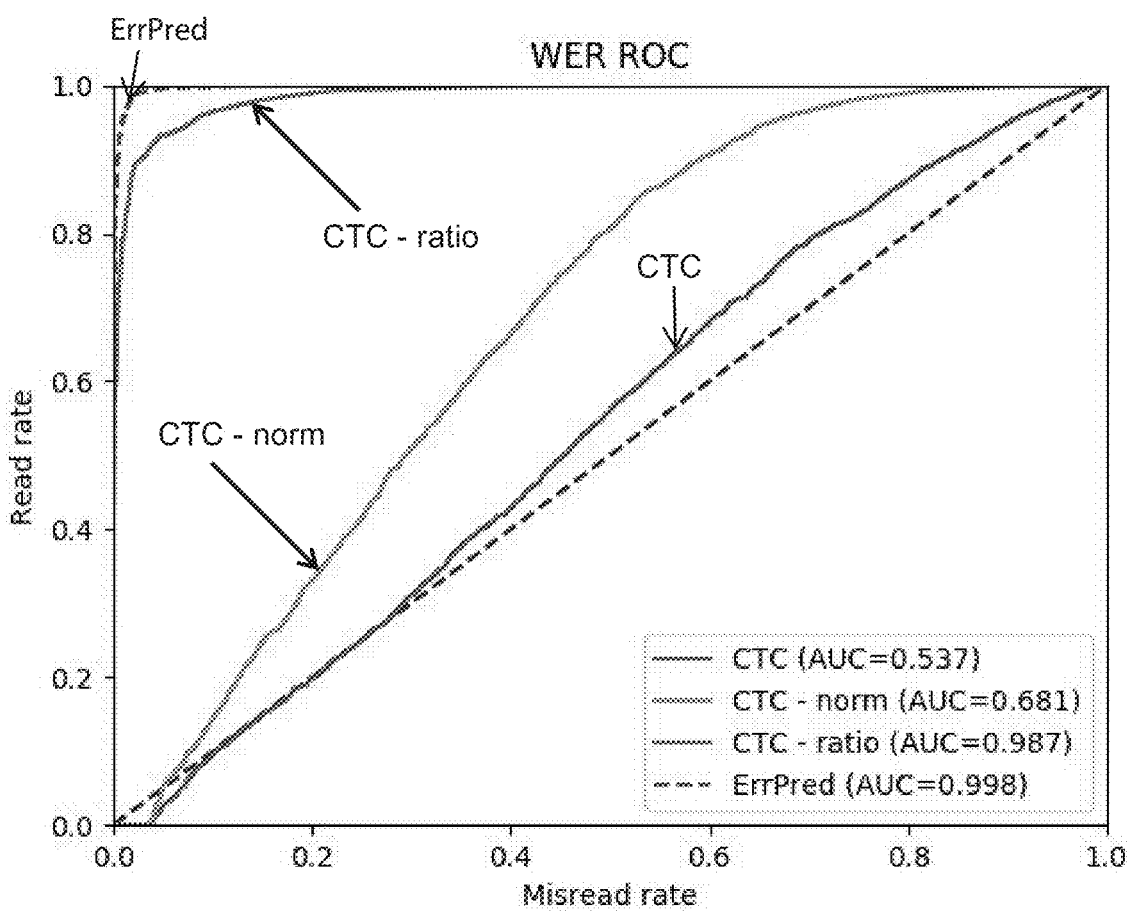
FIGS. 7A and 7B show ROC curves produced in experiments performed according to some embodiments of the present invention using a test set obtained from owned by Orbograph Ltd. Yavne, Israel.
Figure 7B:
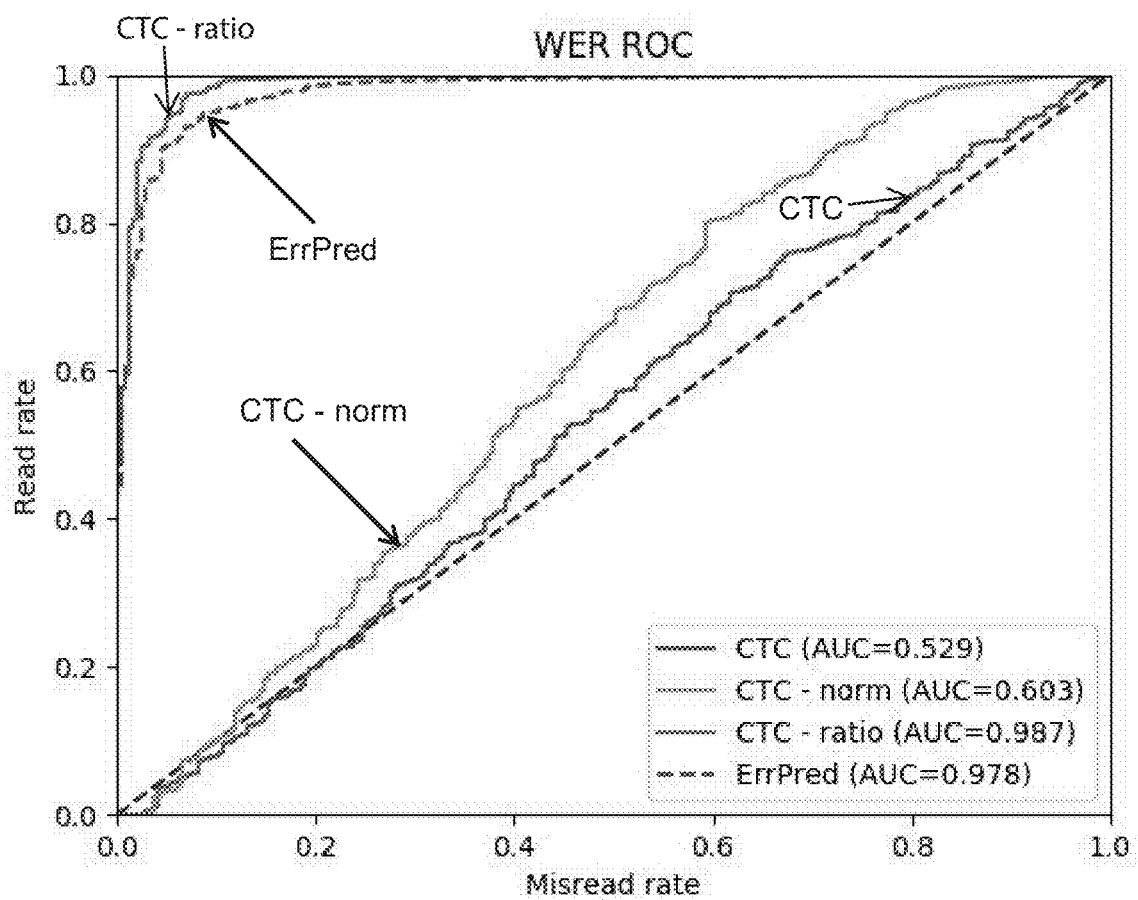
Figure 8A:
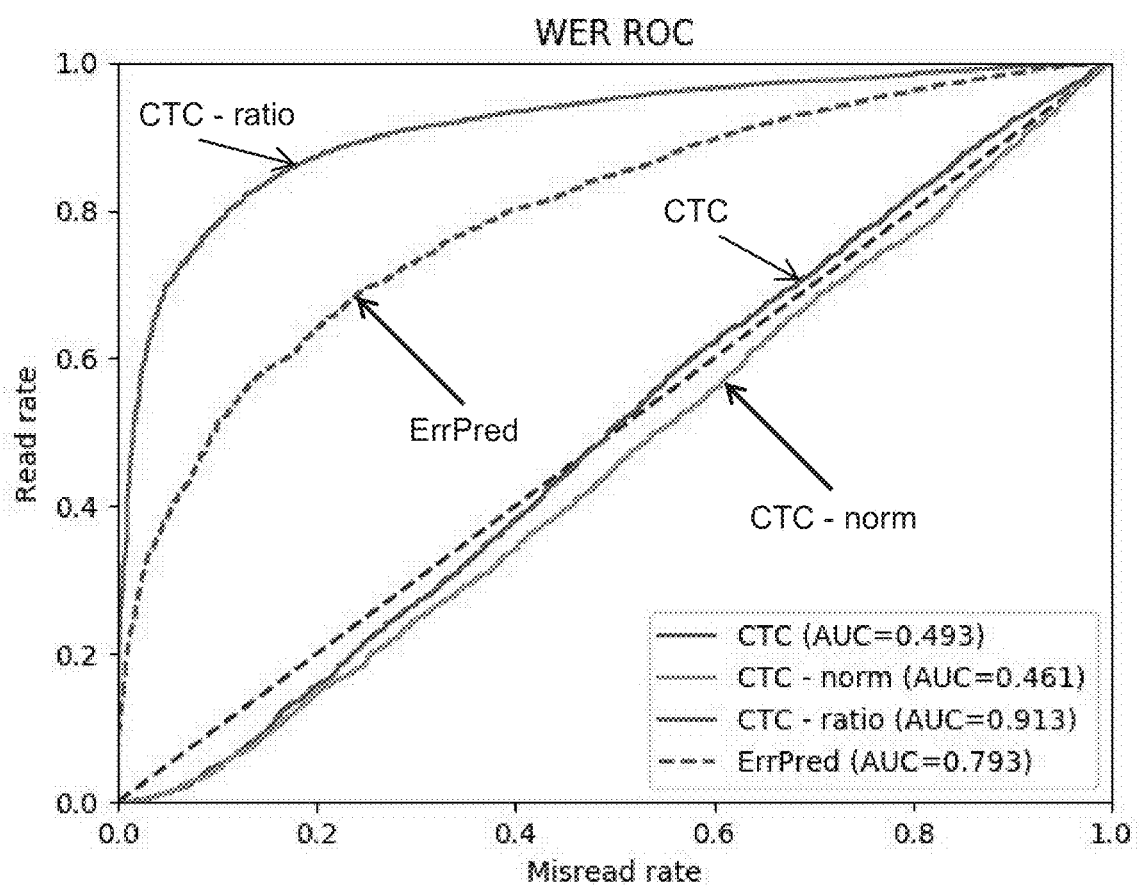
FIGS. 8A-D show ROC curves produced in experiments performed according to some embodiments of the present invention using test sets referred to as IAM, RIMES, SVT and IC13, respectively.
Figure 8B:
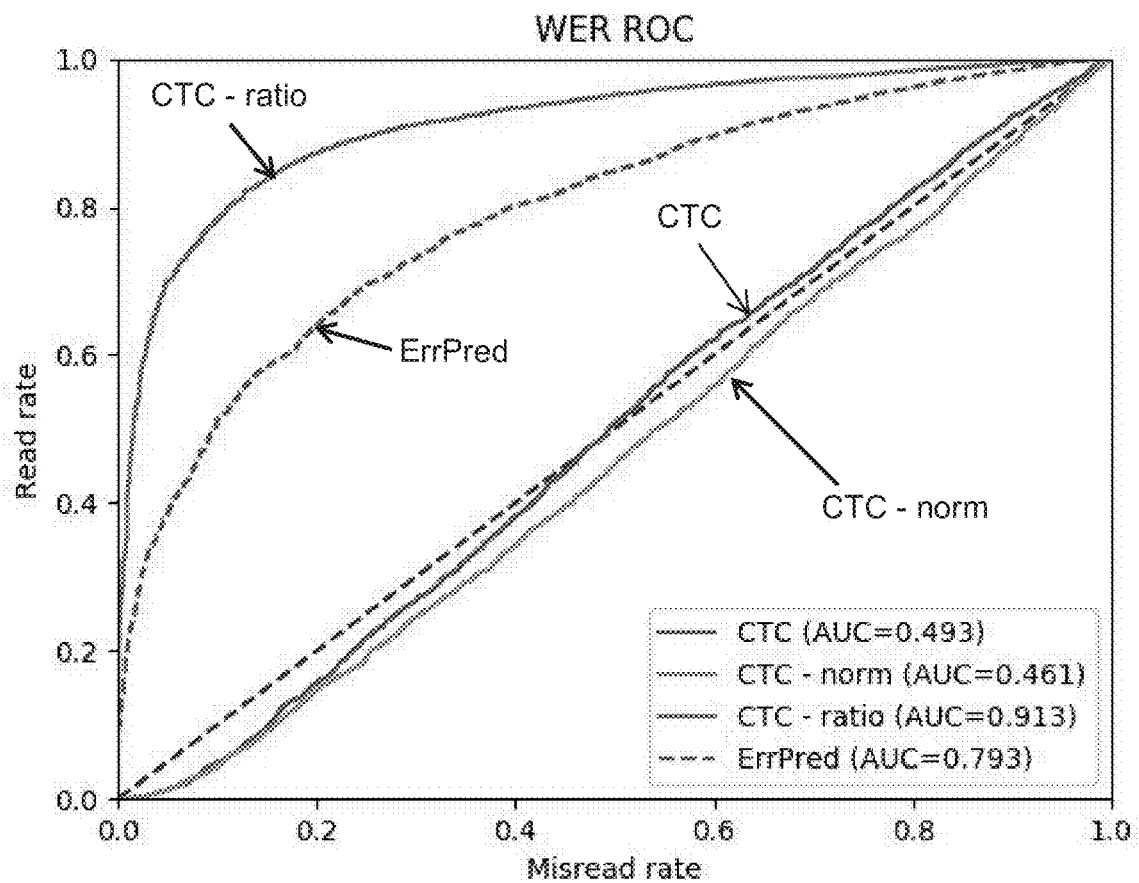
Figure 8C:
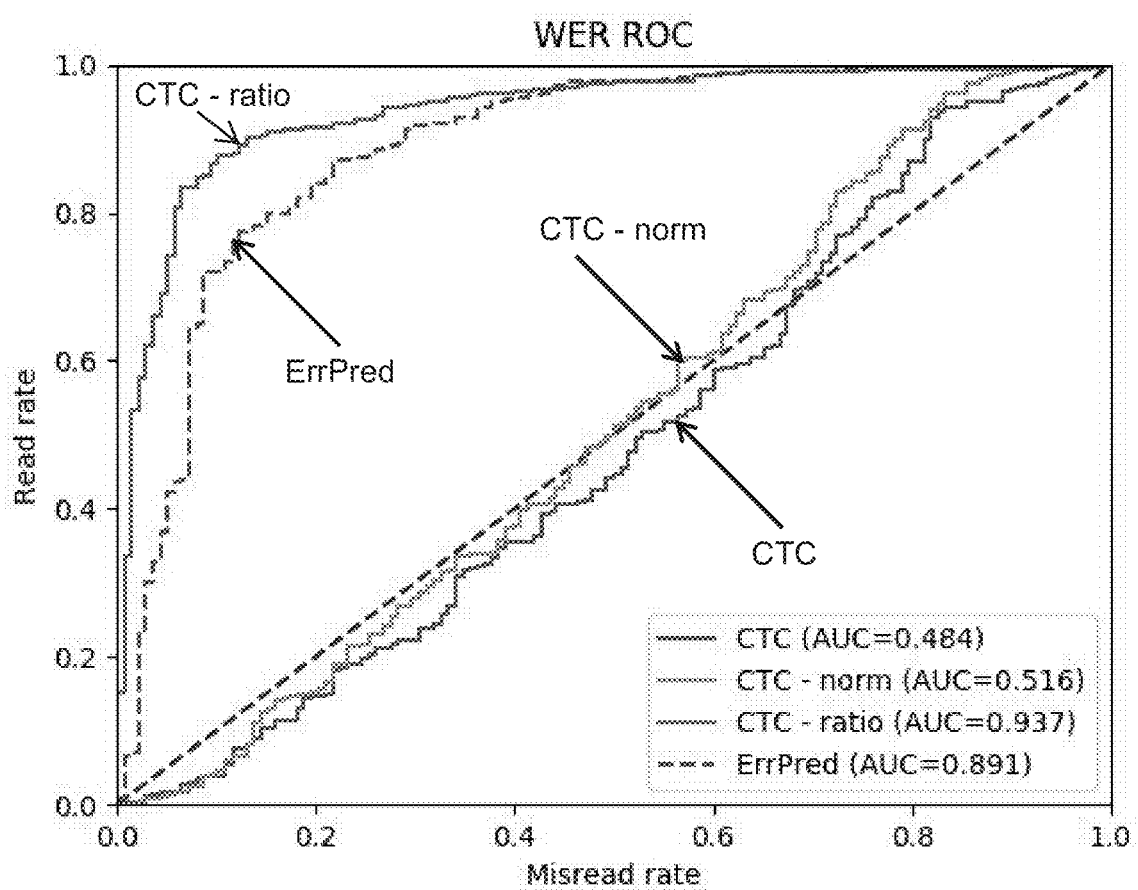
Figure 8D:
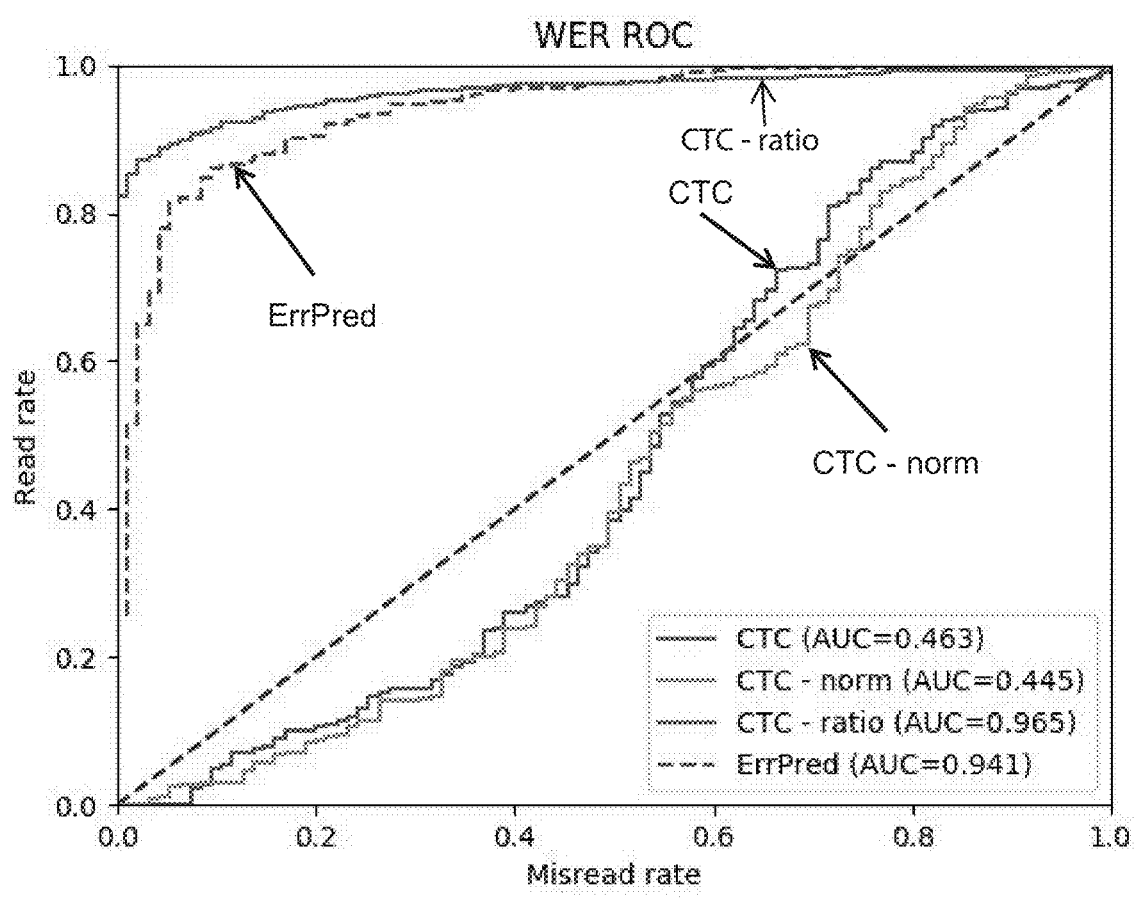

The Orbograph dataset consists of 1 million labeled images of automatically scanned and cropped fields denoting dollar amounts. This dataset was created by collecting dollar amount scanned text samples from real-world printed documents and having them manually labeled. Since this is unfiltered real-world data, it has an amount of reject samples, which were used to train the method of the present embodiments. FIGS. 7A and 7B show ROC curves on the test set of the Orbograph dataset, where FIG. 7A shows the ROC curves for all images of the test set, and FIG. 7B shows the ROC curve for the non-rejected images of the test set. A misread refers to either a reject image receiving a high confidence score, or a non-reject image receiving the wrong transcription with a high confidence score.

The experiments were implemented in TensorFlow and trained on an nVidia Titan X and on an nVidia K80. CTC decoding was used a search beam of size 100. Training was done using ADAM[Kingma et al., A method for stochastic optimization, arXiv preprint arXiv:1412.6980, 2014], with an initial learning rate of $10^{-4}$.

Table 2 summarizes the accuracy obtained for each benchmark, as well the AUC obtained by the baselines and the method of the present embodiments, and Table 3 summarizes the accuracy obtained for the numeric dollar amount dataset as well the AUC obtained by the baseline and the method of the present embodiments. In Table 3, the accuracy value for Orbograph (all) refers to all reject samples as misses, and as such it serves to demonstrate the need of an accurate confidence signal.

FIGS. 8A-D show ROC curves for the IAM, RIMES, SVT and IC13, benchmarks, respectively, for both the baseline CTC-based confidence score as well as the method of the present embodiments.

TABLE 2

|  | SVT | ICD13 | IAM | RIMES |
|---|---|---|---|---|
| Accuracy | 78.67% | 88.91% | 79.51% | 88.05% |
| CTC AUC | 0.484 | 0.463 | 0.493 | 0.544 |
| CTC AUC | 0.516 | 0.445 | 0.461 | 0.555 |
| CTC ratio AUC | 0.937 | 0.965 | 0.913 | 0.949 |
| ErrPred AUC | 0.891 | 0.941 | 0.793 | 0.818 |

TABLE 3

|  | Orbograph (all) | Orbograph (No rejects) |
|---|---|---|
| Accuracy | 96.75% (*) | 99.75% |
| CTC AUC | 0.537 | 0.529 |
| CTC (norm) AUC | 0.681 | 0.603 |
| CTC ratio AUC | 0.987 | 0.987 |
| ErrPredict AUC | 0.998 | 0.978 |

Tables 2, 3 and FIGS. 8A-D demonstrate that the method of the present embodiments is effective in predicting and preventing OCR errors. In all datasets that have no reject samples, the probability ratio technique proved to be highly effective. When training on large datasets, both the probability ratio technique and the technique employing the error prediction branch obtain very convincing results. Without wishing to be bound to any particular theory, the relatively smaller accuracy obtained using the error prediction branch is explained by the lack of data.

Orbograph's dataset provides better benchmark conditions, as it is not synthetic and contains many samples. Additionally, this dataset mimics the real-world conditions and requirements of an OCR system by containing reject samples. As shown in FIGS. 7A and 7B, when measuring error prediction accuracy without considering rejects, both techniques give very good performance, with the probability ratio method getting a slight edge. However, when considering reject samples as well, the technique employing the error prediction branch achieves exceptionally good results. The latter technique was able to reduce the error rate by as much as 99.7%, while rejecting as few as 1% of the valid samples.

FIG. 9 shows non-reject image examples from the Orbograph's dollar amount dataset at different levels of confidence, for qualitative assessment. It is expected to find that samples from the bottom confidence percentile are difficult to read for an OCR model trained on cropped, printed dollar amounts. Indeed, one sample is handwritten, one includes the surrounding box due to imperfect cropping, one includes unrelated text and markings, and the other two are blurry. Text in the fifth percentile is already fully legible and reasonably cropped. Note that the top percentiles are completely dominated by samples with the label "$0.00". The reason for that is that the dataset includes many such samples, and so the neural network of the present embodiments learned to recognize them with high confidence.

This Example demonstrates that the technique of the present embodiments vastly outperform the baselines suggested, and prove to be applicable to printed text OCR, handwritten text OCR, and scene text recognition.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of recognizing image content, comprising:
   applying a neural network to the image, said neural network comprising an input layer for receiving the image, a plurality of hidden layers for processing the image, and an output layer for generating output pertaining to an estimated image content based on outputs of said hidden layers;
   applying a neural network branch to an output of at least one of said hidden layers, said neural network branch being independent of said neural network and having an output layer for generating output pertaining to an estimated error level of said estimate; and
   generating a combined output indicative of the estimated image content and the estimated error level.

2. The method according to claim 1, wherein said neural network branch comprises at least one recurrent layer generating a plurality of output values.

3. The method of claim 2, wherein said at least one recurrent neural layer is a Long Short Term Memory (LSTM) layer.

4. The method of claim 3, wherein said LSTM layer is a bi-directional layer.

5. The method according to claim 2, further comprising summing or averaging said plurality of output values or projections thereof, thereby providing said estimated error level.

6. The method according to claim 1, wherein said neural network comprises a convolutional neural subnetwork generating a set of feature vectors, each corresponding to an application of said convolutional subnetwork different window within the image.

7. The method of claim 6, wherein said neural network comprises a recurrent neural subnetwork receiving said set of feature vectors from said convolutional neural subnetwork, and wherein said output of said at least one of said hidden layers is an output of at least one layer of said recurrent neural subnetwork.

8. The method of claim 7, wherein said recurrent neural subnetwork comprises Long Short Term Memory (LSTM) layers.

9. The method of claim 8, wherein at least one of said LSTM layers is a bi-directional layer.

10. The method according to claim 7, wherein said recurrent neural subnetwork generates a sequence of vectors, and the method comprises projecting a dimension of each vector of said sequence onto a predetermined dimension corresponding to a length of an alphabet, to provide a sequence of probability distributions over said alphabet, each probability distribution corresponding to a region within the image.

11. The method according to claim 10, wherein said neural network comprises a Connectionist temporal classification (CTC) layer receiving said sequence of probability distributions and generating said estimate.

12. The method according to claim 1, further comprising transforming a height of the image to a predetermined height, prior to said application of said neural network.

13. The method according to claim 1, wherein the image is an image of handwritten symbols.

14. The method according to claim 1, wherein the image is an image of machine printed symbols.

15. The method according to claim 1, wherein the image comprises at least one region containing handwritten symbols and at least one region containing machine printed symbols.

16. The method according to claim 1, wherein the image is an image of a bank check.

17. The method according to claim 16, wherein said bank check comprises a plurality of bank check fields, and the method is repeated separately for at least two of said bank check fields.

18. A computer software product, comprising a computer-readable medium in which program instructions are stored, which instructions, when read by a computer, cause the computer to receive an input image and to execute the method according to claim 1.

19. A system for recognizing image content, comprising:
   an imaging system for imaging an object to provide an image thereof; and
   an image processor configured for:
   receiving the image;

applying a neural network to the image, said neural network comprising an input layer for receiving the image, a plurality of hidden layers for processing the image, and an output layer for generating output pertaining to an estimated image content based on outputs of said hidden layers;

applying a neural network branch to an output of at least one of said hidden layers, said neural network branch being independent of said neural network and having an output layer for generating output pertaining to an estimated error level of said estimate; and generating a combined output indicative of the estimated image content and the estimated error level.

20. A system for recognizing image content, comprising:

a network interface for receiving an image over a communication network; and an image processor configured for:

applying a neural network to the image, said neural network comprising an input layer for receiving the image, a plurality of hidden layers for processing the image, and an output layer for generating output pertaining to an estimated image content based on outputs of said hidden layers;

applying a neural network branch to an output of at least one of said hidden layers, said neural network branch being independent of said neural network and having an output layer for generating output pertaining to an estimated error level of said estimate; and generating a combined output indicative of the estimated image content and the estimated error level.

* * * * *